United States Patent
Nelias (10) Patent No.: US 7,641,953 B2
(45) Date of Patent: Jan. 5, 2010

(54) COMPONENT FOR A VEHICLE INTERIOR HAVING A SOFT-FEEL TOUCH

(75) Inventor: Francois Nelias, Croix (FR)

(73) Assignee: Visteon Global Technologies, Inc., Van Buren Township, MI (US)

(*) Notice: Subject to any disclaimer, the term of this patent is extended or adjusted under 35 U.S.C. 154(b) by 723 days.

(21) Appl. No.: 11/293,633

(22) Filed: Dec. 2, 2005

(65) Prior Publication Data

US 2007/0128410 A1 Jun. 7, 2007

(51) Int. Cl.
- B32B 3/00 (2006.01)
- B32B 3/02 (2006.01)
- B60J 5/00 (2006.01)
- B60K 37/00 (2006.01)

(52) U.S. Cl. .......................... 428/57; 428/68; 428/182; 296/146.7; 180/90

(58) Field of Classification Search .................. 428/33, 428/57, 60, 61, 68, 158, 172, 182; 296/70, 296/146.7; 180/90
See application file for complete search history.

(56) References Cited

U.S. PATENT DOCUMENTS

| | | | |
|---|---|---|---|
| 4,829,644 A | 5/1989 | Kondo et al. |
| 4,833,741 A | 5/1989 | Mizuno et al. |
| 4,861,543 A | 8/1989 | Rafferty |
| 5,225,261 A | 7/1993 | Kargarzadeh |
| 5,262,108 A | 11/1993 | Minke et al. |
| 5,304,273 A | 4/1994 | Kenrick et al. |
| 5,328,349 A | 7/1994 | Minke et al. |
| 5,370,831 A | 12/1994 | Blair et al. |
| 5,401,355 A | 3/1995 | Stiller |
| 5,509,990 A | 4/1996 | Masui et al. |
| 5,573,617 A | 11/1996 | Franck et al. |
| 5,705,005 A | 1/1998 | Ash |
| 5,773,115 A | 6/1998 | Ash |
| 5,964,017 A | 10/1999 | Roberts |
| 6,071,619 A | 6/2000 | De Winter |
| 6,214,157 B1 | 4/2001 | Spengler |
| 6,524,510 B2 | 2/2003 | Spengler |
| 2001/0000584 A1 | 5/2001 | Spengler |

FOREIGN PATENT DOCUMENTS

| | | |
|---|---|---|
| JP | 55107436 | 8/1980 |
| JP | 60208210 | 10/1985 |
| JP | 61220823 | 10/1986 |
| JP | 62204408 | 9/1987 |
| JP | 1047514 | 2/1989 |
| JP | 1059019 | 3/1989 |
| JP | 1093311 | 4/1989 |

(Continued)

*Primary Examiner*—Donald Loney
(74) *Attorney, Agent, or Firm*—Brinks Hofer Gilson & Lione (57) ABSTRACT

A component for an interior of a vehicle including a substrate, a skin cooperating with the substrate to define a cavity, and foam disposed within the cavity. The skin includes first and second skin components cooperating to define an outer show surface and a hidden support portion that extends away from the show portion. The skin components matingly engage each other along the length of the support portion to substantially prevent the foam from leaking therebetween. Additionally, the support portion includes an deformable portion to improve the soft-touch feel of the component.

16 Claims, 5 Drawing Sheets

FOREIGN PATENT DOCUMENTS

| | | |
|---|---|---|
| JP | 2099307 | 4/1990 |
| JP | 2112914 | 4/1990 |
| JP | 3055219 | 3/1991 |
| JP | 6218803 | 8/1994 |
| JP | 8058375 | 3/1996 |
| JP | 8142072 | 6/1996 |
| JP | 8323899 | 12/1996 |
| JP | 9207168 | 8/1997 |
| JP | 10225946 | 8/1998 |
| JP | 11179809 | 7/1999 |
| JP | 11348057 | 12/1999 |
| JP | 2002067054 | 3/2002 |
| JP | 2003262956 | 9/2003 |
| JP | 2004330576 | 11/2004 |
| WO | WO 2004/082917 A1 | 9/2004 |

COMPONENT FOR A VEHICLE INTERIOR HAVING A SOFT-FEEL TOUCH

BACKGROUND

1. Field of the Invention

The present invention relates generally to a component for an interior of a vehicle. More particularly, the invention relates to a soft-feel component for an instrument panel having two colors adjacent to each other in the skin covering.

2. Related Technology

Vehicle interiors, such as instrument panels, usually include a component having a soft-touch feel. For example, the soft-feel component typically includes a generally rigid substrate or carrier layer over which is a foam layer and a soft-feel skin layer. Occasionally, for aesthetic purposes, it is desirable for the component to have a bi-colored appearance. More specifically, it is desirable for the portion of the soft-feel skin that is exposed to the vehicle occupants, which is commonly known as the show surface, to have two or more differently-colored sections. Additionally, or alternatively, it may be desirable for the soft-feel skin layer to have two or more sections with different textures or patterns so that the component has a bi-textured feel.

One currently-known design for a bi-colored component is a soft-feel skin having a first area that is painted a first color and a second area that is painted a second color. In an alternative design, the soft-feel skin only includes a first painted area and the remaining portion of the skin remains its natural color. Both of these designs, however, may have an undesirably irregular or non-continuous border between the respective skin areas. The painted design may also require the skin to be pre-treated, thereby increasing the complexity and cost of producing the component. Moreover, painted areas of the soft-feel skin may be more prone than non-painted areas to premature color fading and/or paint chipping or cracking. Furthermore, it may not be possible to produce a component having a bi-textured skin through painting alone.

Another currently-known design for a bi-colored component includes a soft-feel skin manufactured through a powder slush process. More specifically, a mold conforming to the shape of the soft-feel skin is provided and a portion of the mold inner surface is coated with a powder having a first color. The mold is then heated sinter the first color. Next, the remaining portion of the mold inner surface is coated with a powder having a second color. The mold is again heated, sintering the second powder/color and bond it to the first. The skin is then removed from the mold for foaming and further manufacturing. However, as with painting the soft-feel skin, the powder slush method may require the time-consuming and/or costly steps to ensure accurate delivery of the powder coating to the mold surface. Moreover, the border between the respective powder sections may be irregular or non-continuous, although the irregularities may be masked or partially-hidden by forming a groove in the skin at the transition.

Yet another known bi-colored construction is to separately form a pair of soft-feel skin components and then assemble the two, prior to foaming, by gluing or a tape deposit at the seam. However, this design may have an aesthetically undesirable non-soft transition, raised ridge or depressed indentation along the transition of the respective skin components. Additionally, the component may be susceptible to foam leakage between the skin components. Moreover, design modifications and additional components intended to reduce or alleviate the above-mentioned aesthetic irregularities and sealing weaknesses may reduce the soft-touch feel of the component.

Therefore, it would be advantageous to provide a component for an interior of a vehicle having two skin components engaged with each other such as to substantially prevent foam from leaking therebetween without substantially diminishing the soft-touch feel of the component.

SUMMARY

The present invention overcomes the drawbacks and limitations mentioned above by providing a component for an interior of a vehicle that includes a carrier or substrate and a skin cooperating to define a cavity. A foam material is disposed within the cavity and joins the substrate to the skin. The skin includes two skin components cooperating to define an outer surface or "show" portion and a support portion, the latter extending away from the show portion. The skin components matingly engage each other substantially completely along the length of the support portion and this prevents the foam from leaking therebetween. Additionally, the support portion is shaped so as to define a portion that improves the soft-touch feel of the component. The soft-touch feel of the component is improved by providing a relatively consistent soft-touch feel over the entire surface of the skin.

In one aspect of the present invention, the deformable portion defines a free shape when the support portion is in a natural or free state and defines a deflected shape when in a deflected state. More specifically, when an external force is applied to the component skin, the deformable portion deflects or at least partially collapses and permits compression of the support portion, thereby making the component more compressible in the area of the support portion.

In another aspect of the present invention, the deformable portion generally defines a sinuous, wavy shape, or zigzag shape. In the sinuous and wavy shapes, the deformable portion is preferably provided with a free radius that is greater than the thickness of the either skin component.

In one design, the skin support portion includes a generally linear portion adjacent to the skin show portion and before the deformable portion. The linear portion preferably extends generally perpendicularly from the show portion so that each of the skin components substantially defines a 90 degree angle in this area. This configuration creates a generally equal force distribution between the respective skin components so that skin show portion is generally planar along a transition area between the respective components.

As another aspect, the substrate preferably includes a recessed portion generally aligned with the skin support portion to define a gap or space between the substrate and the support portion. The gap permits foam to flow between the substrate and the support portion while the foam is being injected into the cavity. Furthermore, the gap increases the longitudinal distance that the support portion is able to compress during an application of the above-described external force, thereby further increasing compressibility of the component in the area of the support portion and its soft-touch feel.

The respective skin components are preferably coupled with each other by a sealing component, such as tape, adhesive, clip of other means, to further prevent foam leakage between the respective components.

Additionally, for aesthetic purposes, the first and second skin components are preferably differently-colored.

Further objects, features and advantages of this invention will become readily apparent to persons skilled in the art after a review of the following description, with reference to the drawings and claims that are appended to and form a part of this specification.

DETAILED DESCRIPTION

Figure 1:
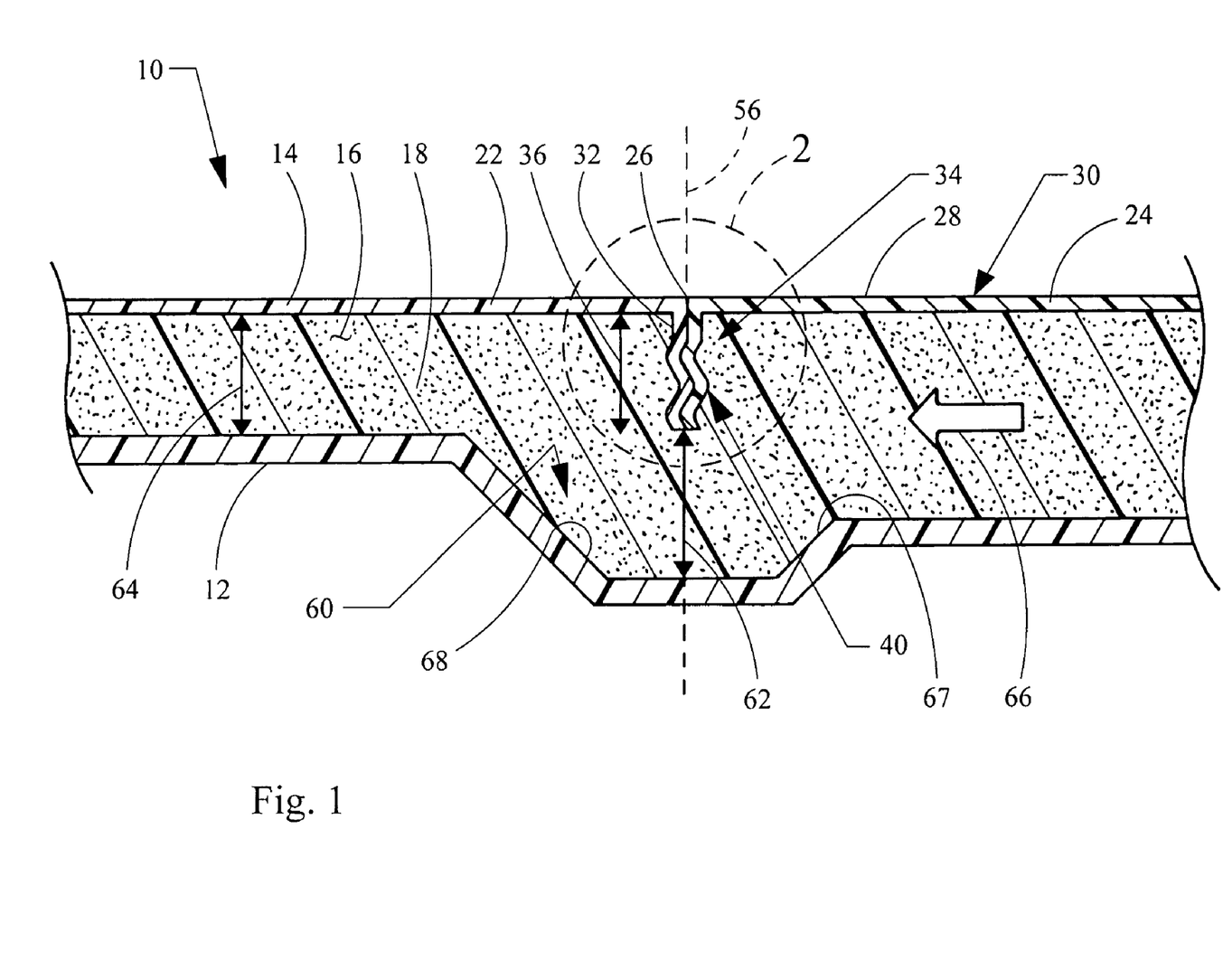
FIG. 1 is a component for an interior of a vehicle embodying the principles of the present invention, the component including a substrate and a pair of skin components defining a cavity and foam disposed within the cavity.

Referring now to the drawings, FIG. 1 shows a component 10 for the interior of a motor vehicle, such as an instrument panel. The component 10 includes a carrier or substrate 12, a skin 14 cooperating with the substrate 12 to define a cavity 16, and foam material 18 disposed within the cavity 16. As discussed herein, it may be desirable for aesthetic purposes to have a bi-colored and/or a bi-textured component 10. Therefore, the skin 14 includes a first skin component 22 having a first color and/or texture and a second skin component 24 having a second color and/or texture. Furthermore, the first and second skin components 22, 24 are positioned with respect to each other so that a generally planar transition area 26 is provided between the components 22, 24.

The skin components 22, 24 cooperate to define a show portion 28, which includes an outer surface 30 of the component 10 exposed to the vehicle interior. The skin components 22, 24 also define support portion 34, which is a portion of the component 10 hidden from the vehicle interior extending into the cavity 16.

Via its shape and length, support portion 34 extends away from the show portion 28 along a support portion length 36 and sufficient to substantially prevent the foam material 18 from leaking out of the cavity 16 between the skin components 22, 24. This is partially achieved by the respective portions of the skin components 24, 26 that form the support portion being correspondingly shaped and matingly engaged along their length. For example, in one design this support portion length 36 is between 5 and 25 millimeters. In an even more preferred design, the support portion length 36 is approximately 10 millimeters. The skin components 22, 24 are correspondingly shaped so as to matingly engage each other along the support portion 34 enhancing the foam-tight seal.

Figure 2:
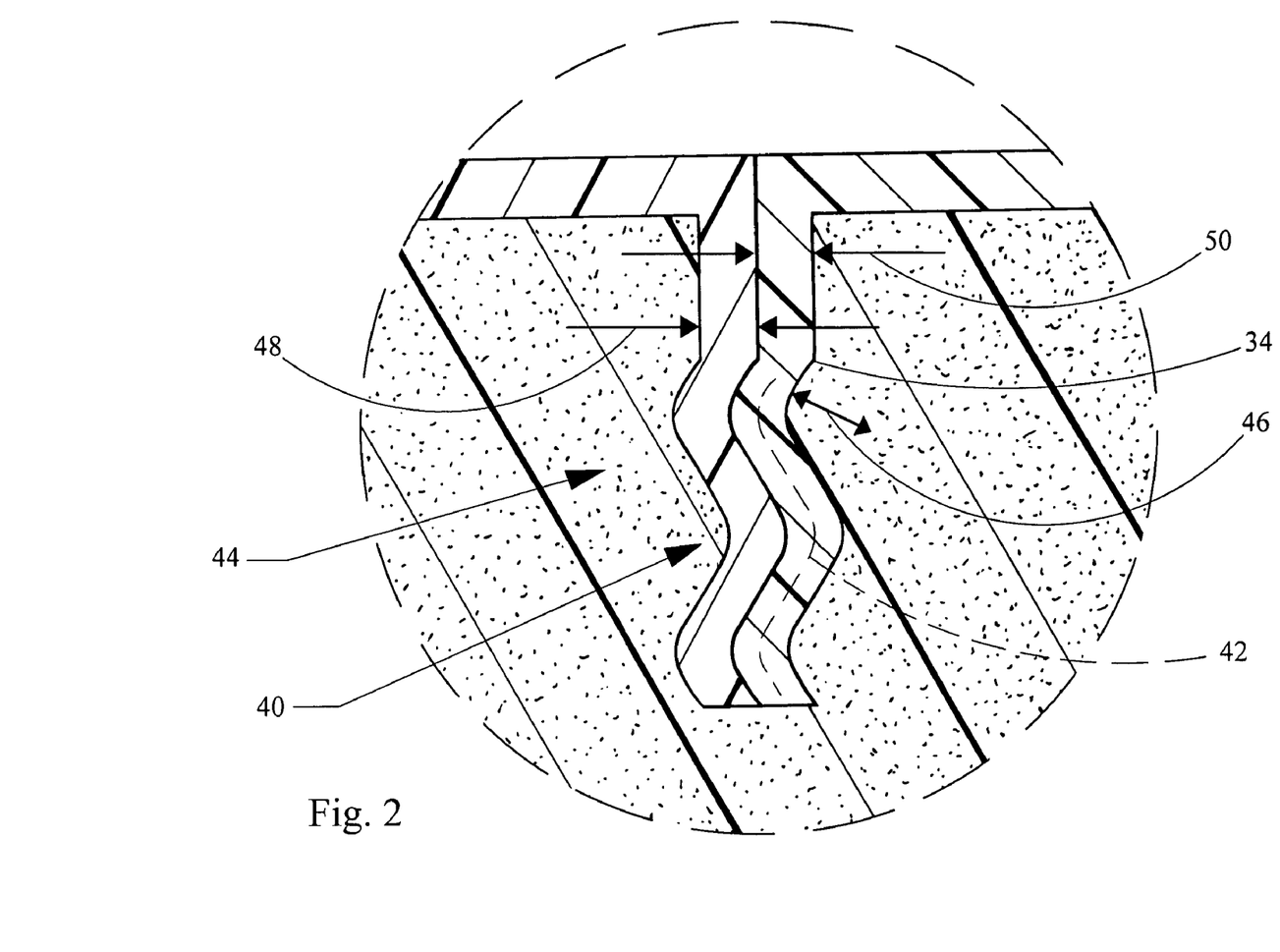
FIG. 2 is an enlarged view of a transition area between the first and second skin components, as indicated by line 2-2 in FIG. 1.

As seen in FIGS. 1 and 2, adjacent to the show portion 28 the support portion 34 preferably includes a generally straight or linear portion 32 extending in a direction generally perpendicular to the show portion 28 This minimizes ripples and other irregularities in the transition area 26 of the skin 14. Because the skin components 22, 24 are each bent at an angle roughly equal to 90 degrees, any spring forces generated by the respective components are generally equal to each other in magnitude and opposite in direction. Although these spring forces are typically weak, due to the high flexibility of the skin 14, even small forces may cause surface imperfections over time. The linear portion 32 minimizes the possibility of these imperfections.

Figure 3:
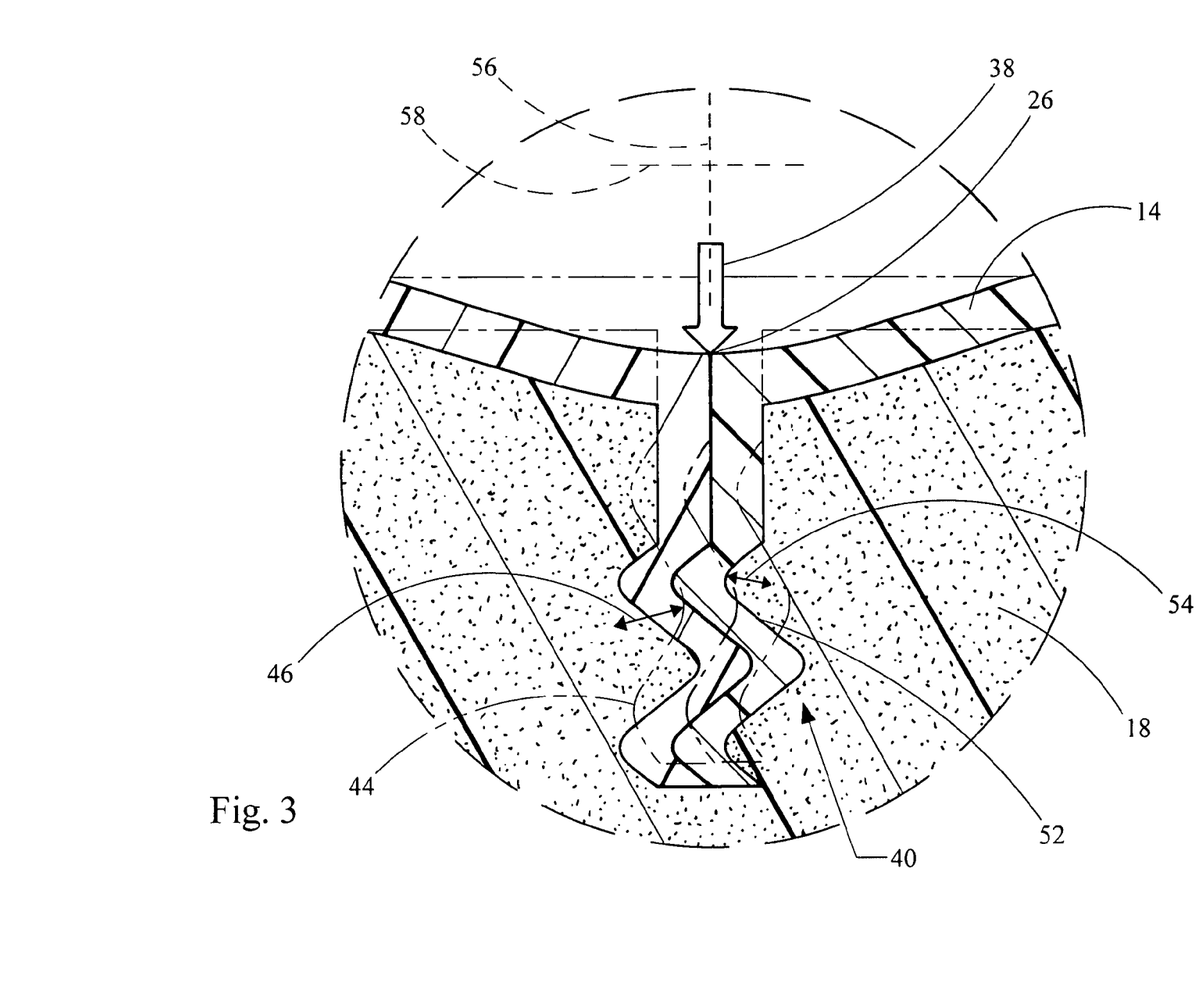
FIG. 3 is an enlarged view of the transition area similar to FIG. 2, where the component is being compressed by an external force.

As another advantage of the perpendicular orientation of the support portion 34, relative to the show portion 28, the foam material 18 is generally equally-distributed on both sides of the support portion 34 since each face of the support portion 34 is similarly situated with respect to the upper wall of the cavity 16. By equally distributing the foam material 18 within the cavity 16 and minimizing air pockets, the component 10 will have a relatively consistent soft-touch feel. Furthermore and as shown in FIG. 3, the skin 14 on either side of the transition area 26 will generally deflect equally when an external force 38 is applied to the transition area 26. Additionally, the skin support portion 34 will act as a guide and compress the foam material 18 located there below, causing the component 10 to generally deflect in a direction aligned with the support portion 34.

As shown in FIG. 2, adjacent to the linear portions 32, the support portion 34 also includes a deformable portion 40. The deformable portion 40 is generally corrugated and may have a variety of specific configurations, such as a wave shape, a sinusoidal shape, a zigzag shape or other shapes. As seen in FIGS. 1 and 2, the deformable portion 40 generally defines a wave shape 42 along its centerline. More preferably, the wave shape 42 is such that the respective wave peaks are equally-spaced from each other. Configured in this manner, when the external force 38 is applied, such as when a vehicle occupant presses the component 10 inward, the deformable portion 40 at least partially collapses allowing the support portion 34 to be compressed in the direction of the external force 38.

When the skin support portion 34 is in an uncompressed or free position (best seen in FIG. 2), the deformable portion 40 is shaped so as to maintain a soft-touch feel during compression. To achieve this, a free radius 46, defined in the lowermost point in the trough between successive crests of the wave shape 42, is dimensioned so as to be greater than the thickness 48 of the first skin component 22 and the thickness 50 of the second skin component 24. Alternatively described, the sum of the positive and negative amplitudes (combined amplitude) of the wave shape 42 is greater than the thicknesses 48, 50 of either skin component 22, 24.

Referring now to FIG. 3, the behavior of the support portion 34 during compression is illustrated therein. FIG. 3 shows the skin support portion 34 in a deformed position or compressed state 52 (in solid lines) as a result of the external force 38 being applied to the transition area 26 of the skin 14. Additionally, for reference purposes only, the support portion 34 in the natural state 44 (in phantom lines) is also shown. When the support portion 34 is compressed, the deformable portion 40 shortens in length and a compressed radius 54 is defined in the trough, which is smaller than the free radius 46. Furthermore, the end of the support portion 34 is displaced in a longitudinal direction 56, parallel with the direction of the external force 38, and the combined amplitude increases in a direction that is transverse or perpendicular direction 58 thereto. Thus the foam material 18 is compressed in both the longitudinal and transverse directions 56, 58. As a result of the bi-directional foam compression, the external force 38 is distributed over a larger volume of foam material 18 and the component 10 is able to be compressed relatively easily and consistently in the transition area 26.

By comparison, if the support portion 34 was not conducive to the above-described collapsing action, then the external force 38 would only be absorbed in the longitudinal direction and the soft-touch feel of the component would be degraded in this area.

Referring back to FIG. 1, the substrate 12 also includes a recessed portion 60, generally aligned with the support portion 34 that defines a gap 62 between the substrate 12 and the support portion 34. This recessed portion 60 is located directly below the skin support portion 34 in the longitudinal direction 56 so that the end of the support portion 34 is able to be displaced into the recessed portion 60 upon application of the external force 38. The gap 62 is preferably equal to or greater than the distance between the substrate 12 and the skin 14 on either side of the recessed portion 60.

During manufacturing of the component 10, the substrate 12, which is preferably made of a hard-setting, moldable material such as polypropylene, is injection molded in a first molding device (a substrate mold) as is commonly known in the art. The substrate 12 is removed from the substrate mold and inserted within a second mold (a foaming mold) as is commonly known in the art. The substrate 12 is preferably generally rigid to provide support for the foam and the skin 14.

The skin 14, which is preferably made of a soft-feel, pliable material such as a vinyl compound, a polyvinyl chloride compound, or a thermoplastic polyolefin, is preferably formed by one of the processes commonly known in the art, such as thermoforming or casting. Cast skins typically have a softer, more desirable feel than thermoformed skins. However, thermoformed skins tend to be less rigid than cast skins. The latter, however, causes thermoformed skins to be more susceptible to foam leakage. The present invention helps to minimize the inherent deficiencies of both cast and thermoformed skins.

The cast skin is typically formed within an injection mold having first and second mold cavities for the respective skin components. More specifically, an appropriate molten material is injected into the first skin cavity to cast the first skin component 22 in the shape shown in FIGS. 1 and 2. The second skin component 22 is also formed by the same method in a second skin cavity. The respective skin components are then cooled and removed from their respective cavities, where they are positioned in a form-fitting engagement in the upper mold portion of the foam mold.

As an alternative step to the casting process, thermoformed skins may be formed within a mold having first and second mold cavities for the respective skin components. More specifically, a sheet of material is placed within the first mold cavity, heated and compressed into the shape of the first skin component 22. Similarly, a second sheet of material is placed within the second mold cavity, heated and compressed into the shape of the second skin component 24. The components 22, 24 are then trimmed if necessary and are positioned in a form-fitting engagement in the upper mold portion of the foam mold.

Next, the foam material 18 is injected into the foam mold through one or more injection ports, which may extend through the substrate 12. Additionally, to further promote complete distribution of the foam material 18 throughout the cavity 16, one or more vacuum ports may also be provided through the substrate 12. The foam material 18 preferably flows in the foam direction 66 indicated in FIG. 1 so that a pair of ramped surfaces 67, 68 of the recess 60 equally distribute the foam material 18 on both sides of the support portion 34. More specifically, the upstream ramped surface 67 permits the foam to flow smoothly into the recess 60 of the substrate 12. Additionally, the downstream ramp surface 68 extends upwardly to promote the flow of foam material 18 out of the recess 60 and into the downstream side of the skin support portion 34. Alternatively, the foam material 18 may be injected into the cavity 16 along any direction, or along a plurality of directions. After the setting of the foam 18, the foam mold 83 is opened and the finished component is removed.

Alternatively to the above-described process, the component 10 may be formed by any appropriate means. For example, the component 10 may be formed by an open-mold process, where the foam material is poured into a bowl-shaped region defined by the substrate 12 and the skin 14 is then coupled with the substrate before the foam material 18 becomes fully hardened.

Figure 4:
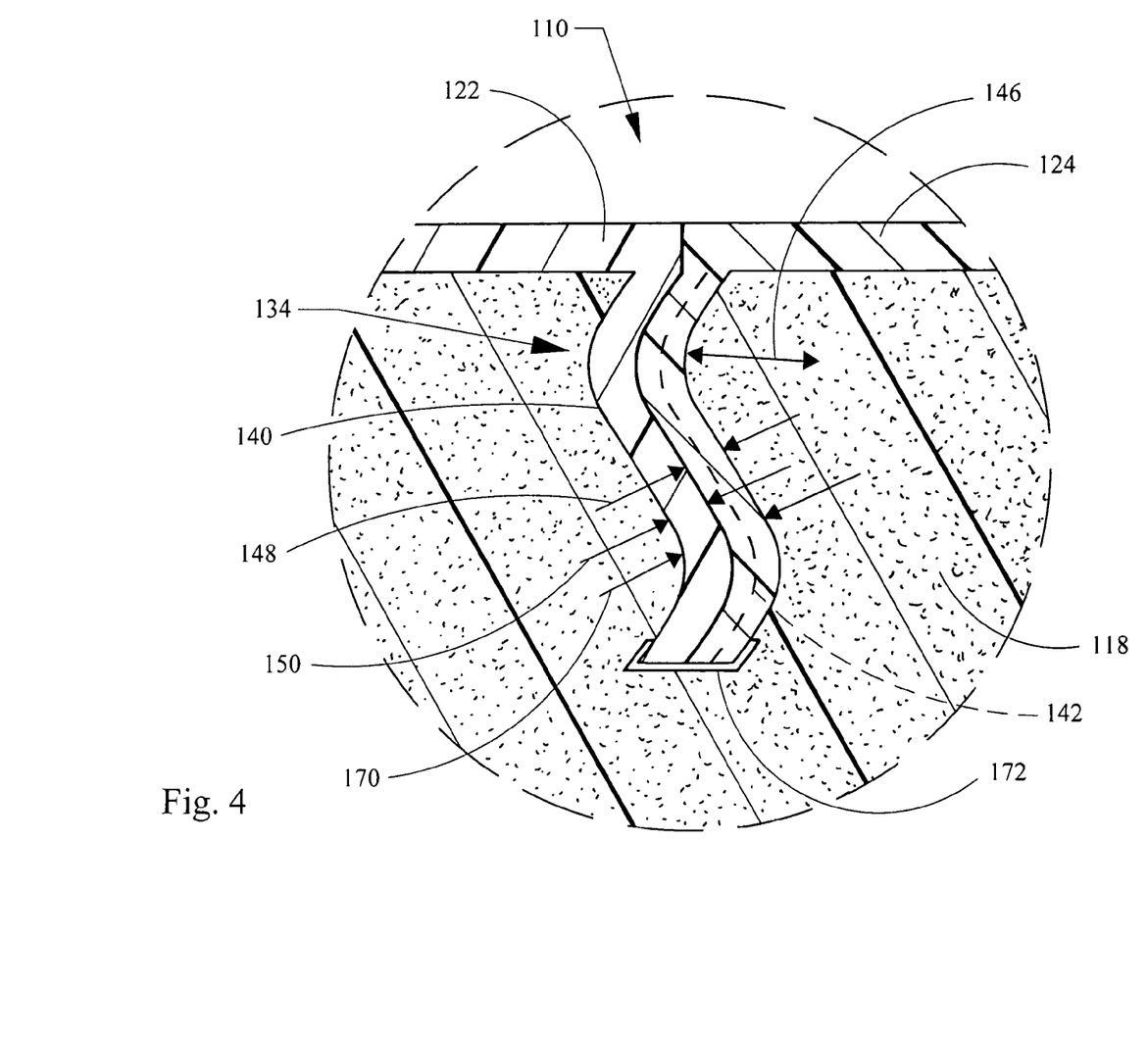
FIG. 4 is an alternative embodiment of a component for an interior of a vehicle embodying the principles of the present invention.

Shown in FIG. 4 is an alternative embodiment of a component 110 for an interior of a motor vehicle. The component 110 is generally the same as component 10 of the first embodiment, except its support portion 134 lacks any corresponding straight portion and is completely defined by a deformable portion 140. As illustrated therein, the support portion 134 is defined by a generally sinusoidal wave shape 142. Additionally, the distal end of the support portion 134 includes a sealing component 172 to substantially prevent the foam material 118 from migrating between the respective skin components 122, 124. The sealing component 172 may be an adhesive-based component, such as tape or glue, or it may be a mechanical-based component such as a fastener. Alternatively, any other suitable sealing component may be used.

Figure 5:
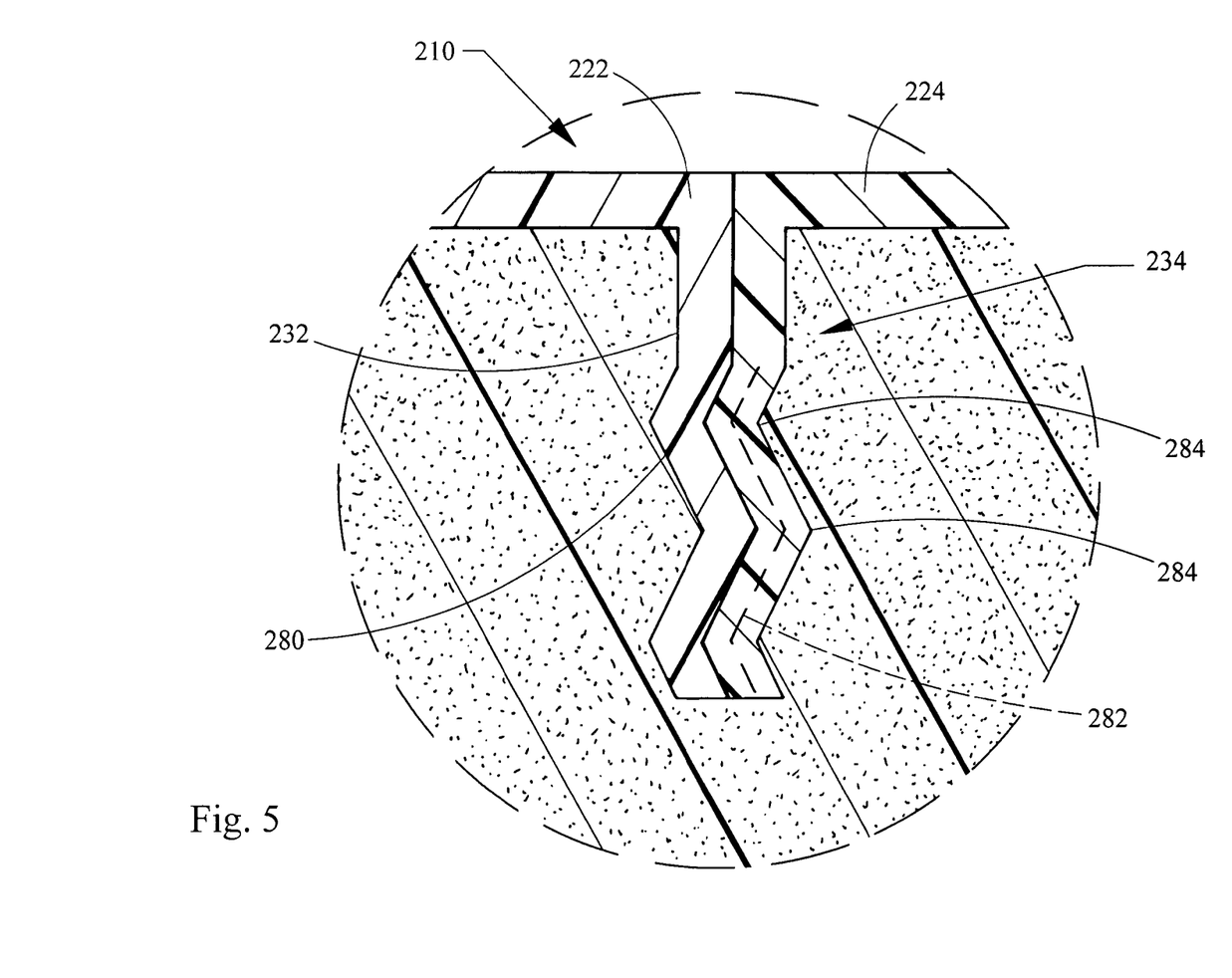
FIG. 5 is another alternative embodiment of a component for an interior of a vehicle embodying the principles of the present invention.

FIG. 5 is another alternative embodiment of a component 210 for an interior of a motor vehicle. The component 210 is identical to the first embodiment, except it support portion 234 has its deformable portion defined by a series of straight sections 284 that are successively angled with regard to each other in a zigzag shape 282. The support portion 234 is therefore conducive to a collapsing or folding action about the successively angled straight portions 284 to transversely disperse an external force applied to the component 210.

It is therefore intended that the foregoing detailed description be regarded as illustrative rather than limiting, and that it be understood that it is the following claims, including all equivalents, that are intended to define the spirit and scope of this invention.

What is claimed is:

1. A component for a motor vehicle interior, the component comprising:
   a rigid substrate, a skin spaced apart from the substrate, foam disposed between and joining the substrate to the skin, the skin having first and second skin components defining a show portion, the show portion including an outer surface adapted to be visible from the motor vehicle interior, portions of the first and second skin components being in mating engagement and cooperating to define a support portion, the support portion extending away from the show portion and toward the substrate, the support portion having a deformable portion configured to be controllably deformed between a free position and a deflected position, in the deflected position the deformable portion being at least partially collapsed into a more compact shape whereby a soft-touch feel of the component is maintained in the deflected position of the deformable portion.

2. A component as in claim 1, wherein the deformable portion defines a free radius within an outwardly open trough between a pair of crests when the support portion is in the free position.

3. A component as in claim 2, wherein the first skin component has a first thickness and the second skin component has a second thickness, the free radius being greater than either of the first thickness and the second thickness.

4. A component as in claim 1, wherein the deformable portion generally defines an outwardly open wave shape having two crests.

5. A component as in claim 4, wherein the deformable portion generally defines a sinusoidal wave shape.

6. A component as in claim 1, wherein the support portion includes a straight portion adjacent to the show portion, the deformable portion being shaped differently than the straight portion over its length.

7. A component as in claim 6, wherein the straight portion extends generally perpendicularly to the show portion.

8. A component as in claim 1, wherein the show portion is generally planar in a transition area between the first skin component and the second skin component.

9. A component as in claim 1, wherein the substrate includes a recessed portion generally aligned with the support portion and defining a gap between the substrate and the support portion.

10. A component as in claim 1, wherein the first skin component and the second skin are coupled with each other by a securing component.

11. A component as in claim 1, wherein the first and second skin components are matingly engaged along the support portion.

12. A component as in claim 1, wherein the first skin component is a first color and the second skin component is a second color.

13. A component as in claim 1, wherein the first skin component has a first textured outer surface and the second skin component has a second textured outer surface.

14. A component as in claim 1, wherein the deformable portion is defined by a series of straight sections successively obliquely angled with respect to the length of the support portion.

15. A component as in claim 1, wherein the deformable portion defines a wave shape over the entire length of the support portion.

16. A component as in claim 1, wherein the first and second skin components of the support structure cooperatively define a wave shape with two crests.

\* \* \* \* \*